June 5, 1956 R. H. JENKINS ET AL 2,749,057
FISH LINE REEL
Filed April 15, 1953
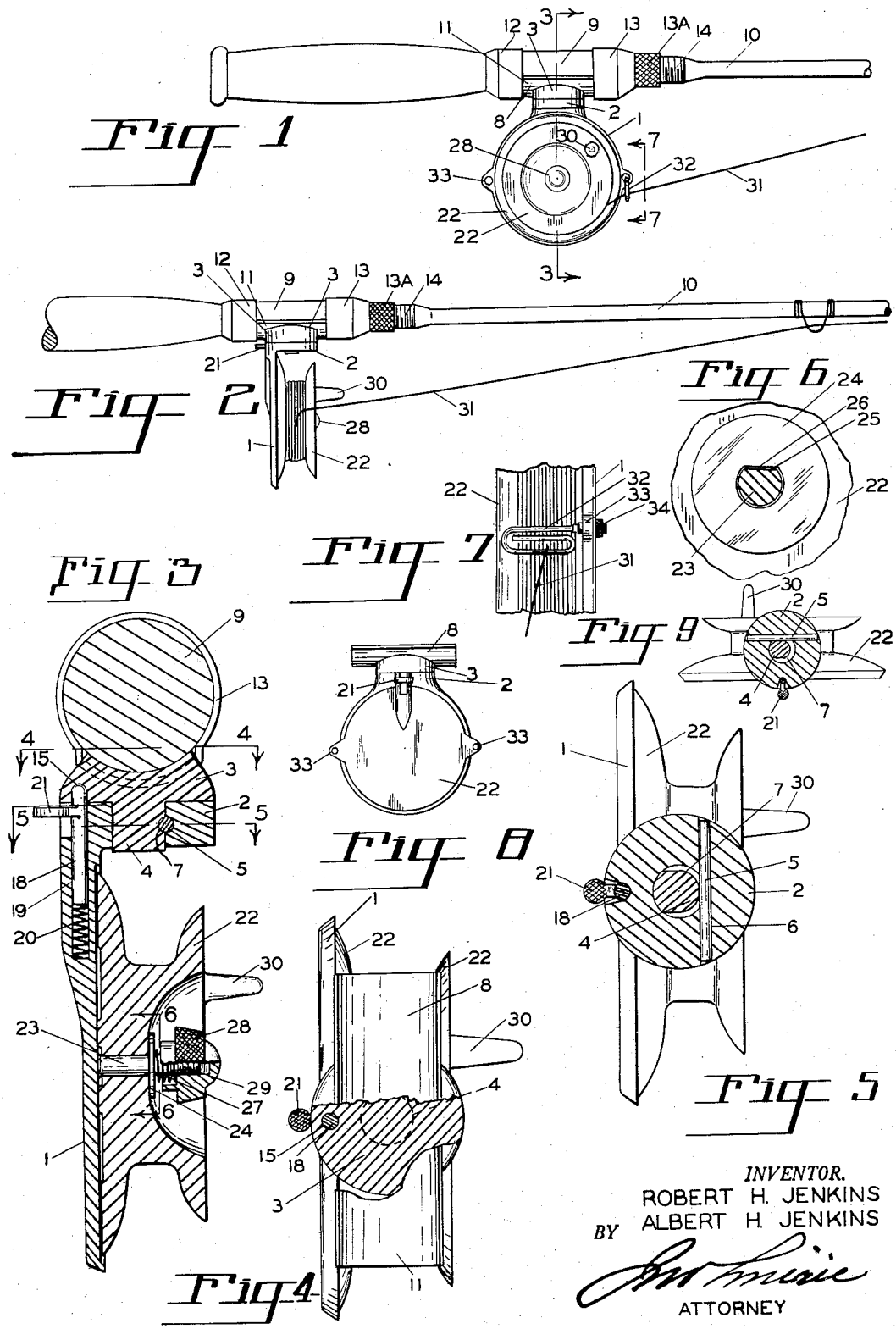
INVENTOR.
ROBERT H. JENKINS
ALBERT H. JENKINS
BY
ATTORNEY

United States Patent Office 2,749,057
Patented June 5, 1956

2,749,057

FISH LINE REEL

Robert H. Jenkins and Albert H. Jenkins, Portland, Oreg.

Application April 15, 1953, Serial No. 348,858

2 Claims. (Cl. 242—84.5)

This invention relates to fishing reels and is particularly adapted for fly fishing.

The primary object of the invention is to construct a reel that can be used as a spinning reel for casting, and which can be readily converted to a reel for retrieving the line.

Another object of the invention is to provide a reel that can be used by either a right or left handed fisherman.

These and other incidental objects will be apparent in the drawings, specification and claims.

Referring to the drawings:

Figure 1 is a fragmentary portion of a fishing rod showing our new and improved reel in position for fly fishing by a right handed fisherman.

Figure 2 illustrates the reel in position for casting.

Figure 3 is an enlarged sectional view, taken on line 3—3 of Figure 1.

Figure 4 is a plan view, taken on line 4—4 of Figure 3, the rod having been removed therefrom and parts broken away for convenience of illustration.

Figure 5 is a plan sectional view, taken on line 5—5 of Figure 3.

Figure 6 is an enlarged detail sectional view, taken on line 6—6 of Figure 3.

Figure 7 is an enlarged fragmentary view, taken on line 7—7 of Figure 1 showing how the line is threaded on to the reel.

Figure 8 is a back view of our new and improved reel.

Figure 9 is the same as Figure 5, except that the reel has been revolved to the position shown in Figure 2.

Referring more specifically to the drawings:

Our new and improved reel consists of a disk-like body 1, having a turntable 2 forming part thereof. A base 3 is adapted to receive the turntable 1 by way of the king pin 4. The turntable 2 is held to the king pin 4 by way of the cross pin 5, which is driven into the hole 6 of the turntable 2, as best illustrated in Figure 5. This pin registers with the groove 7, which is formed in the king pin 4, as illustrated in Figure 3, holding the turntable 2 to the base 3. Noting particularly Figures 5 and 9, the king pin groove 7 is illustrated as circumferentially extending and U-shaped with a pair of diametrically opposite flat sides, the turntable or reel frame 2 being rotatable on the pin for approximately 180°, the cross-pin 5 abutting one or the other flat sides of the groove 7 at the end of such movement as is particularly illustrated in Figure 9.

Forming part of the base 3 is a seat or saddle 8 into which the portion 9 of the rod 10 rests. The end 11 of the seat enters under the usual retaining sleeve 12 while its opposite end is held by a sleeve 13, which is held thereagainst by the nut 13A, which is threaded to the rod at 14. This is of usual construction.

Located on the underside of the base 3 is a hole or socket 15. This hole is adapted to receive the plunger 18, referring to Figures 3 and 4, for holding the reel in the retrieving position as shown in Figures 1, 3, 4 and 5.

The plunger 18 is slidably mounted within the hole 19 and is forced into the above said socket by the spring 20. This plunger is released from the socket by the push button 21, which forms part thereof, the said spring returning the plunger into the desired socket.

We have designed a specially shaped spool 22, which is journalled to the shaft 23, which forms part of the disk-like body 1. A washer 24 is applied over this shaft as best illustrated in Figures 3 and 6. One side of the shaft is flattened at 25, the washer 24 having a flat side 26 adapted to cooperate with the flat side 25 of the shaft 23, preventing the said washer from turning with the spool.

A spring 27 is next applied over the shaft 23 and against the washer 24, after which the knurled nut 28 is threaded on to the threads 29 of the shaft. The amount that the nut is threaded on to the shaft will govern the resistance to the rotation of the spool. The spool is rotated by the outwardly extending handle 30.

In order to thread the line 31 on to the spool, a guide 32 is threadably secured to the body 1 at 33 and locked thereon by the knurled nut 34, referring to Figures 1 and 8 particularly. This guide is adapted to be changed from one side of the reel to the other, depending on whether the same is being used by a right or left handed fisherman.

We will now describe the operation of our reel. The position of the reel as shown in Figures 1, 3, 4 and 5 is the position the reel is in while retrieving the line. The position of the reel shown in Figures 2 and 9 is the position for casting. When the reel is in position for casting the cross pin 5 is located at one end of the groove 7, as shown in Figure 9.

When it is desired to retrieve the line, the fisherman grasps the reel and rotates the same clockwise or to the position shown in Figs. 1, 3, 4 and 8. At this time the plunger 18 will enter the socket 15, locking the reel in this position.

When it is desired to cast the line, the button 21 will be depressed, pulling the plunger 18 out of the socket 15, permitting the reel to be revolved back to the position shown in Figures 2 and 9. In the casting position the reel is not locked, the reason being that no strain is being placed on the reel in this position, therefore no tendency to rotate the same about the king pin 4. Further, it is desirable to be able to quickly revolve the reel from the position shown in Figures 2 and 9 to the position shown in Figs. 1, 3, 4 and 5 without unlocking the same, but when the reel has been rotated to the position, as shown in Figs. 1, 3, 4 and 5 it is desirable to lock the same from rotation because considerable pressure is being exerted on the reel in the winding of the same, which would tend to revolve the same about the pin 4 if it were not locked in this position.

The description thus far has been for a right handed fisherman, but in the event a left handed fisherman is to use this reel, the reel and its saddle 8 are removed from the pole and revolve 180 degrees. To best understand how the reel is brought to the position for left hand operation it is best to refer to Figure 9. In this view the same is shown in right hand operation, and it is shown in the position for casting.

Assume that the base 3 has been revolved 180 degrees counterclockwise on the pole. This will have brought the groove 7 of the pin 4 to the left hand side of the pin as viewed in Figure 9, therefore, when it is desired to bring the reel to the retrieving position it will be revolved counterclockwise bringing the cross pin 5 to the midway position of the groove 7 and registering the socket 15 within the base 3 with the plunger 18, locking the said base in connection with the turntable 2 of the reel.

In other words, when the reel is being used by a left hand operator the reel is revolved counterclockwise untile the same is in retrieving position or that shown to correspond to Figures 1, 3, 4 and 5, the position of groove 7 being 180 degrees from these positions, as well as the position of the locking pin 18 and the socket 15 of the base 3. In order to understand this operation, one must refer to Figure 9 particularly.

When the same has been converted from right to left, the guide 32 is threaded into the opposite side of the reel due to the fact that the line will leave the opposite side of the reel, therefore positioning the guide in its proper relation to the line.

The shape of the guide 32 is rather important due to the fact that it is easy to unthread the line therefrom as observed in Figure 7 or to thread the line therein.

What we claim is:

1. A fishing reel construction comprising a mounting base for mounting a reel on a fishing rod, a reel carrying frame supported by said base and a reel mounted on said frame, said base having a king pin projecting from the surface thereof, said king pin having a U-shaped groove around the major portion of the circumference thereof intermediate its ends, said reel carrying frame including a mounting plate having a bore therein rotatably journaling said king pin, a transverse passsage through said plate chordally intersecting said bore and in registry with said king pin groove, a cross-pin in said passage and seating in said groove holding said frame on said king pin and restricting relative free rotation between said king pin and said frame to 180°, and means interlockingly engaging said reel frame and said base in a selected position to nonrotatably maintain said frame and said base against movement relative to one another.

2. A reel mounting construction enabling a reel to swing free from a casting position at right angles to a fishing rod to a reeling position parallel to the fishing rod, and means releasably locking the reel in reeling position, said construction including a mounting saddle having a king pin projecting therefrom, said king pin having a circumferentially extending groove in the cylindrical side wall surface thereof, said groove having a pair of diametrically opposite flat sides thereon, a reel mounting frame having a bore therein freely rotatably journaling said king pin, said reel mounting frame having a passage chordally intersecting said bore and registering with said groove, a pin in said passage seating in said groove and restricting swinging movement of said frame on said king pin to approximately 180° by engagement with the flat sides of said groove, and means releasably interlockingly engaging said frame and said saddle intermediate the limits of the swinging movement of said frame in said saddle.

References Cited in the file of this patent

UNITED STATES PATENTS

| | | |
|---|---|---|
| 1,621,003 | Dodd | Mar. 15, 1927 |
| 2,581,306 | Slotterback | Jan. 1, 1952 |

FOREIGN PATENTS

| | | |
|---|---|---|
| 20,609 | Great Britain | of 1902 |
| 216,776 | Great Britain | June 5, 1924 |
| 19,600 | Australia | of 1929 |
| 804,067 | France | July 27, 1936 |
| 438,633 | Italy | Aug. 25, 1948 |